United States Patent [19]

Reinhardt

[11] Patent Number: 5,578,926
[45] Date of Patent: Nov. 26, 1996

[54] LOCATING SYSTEM FOR FINDING MAGNETIC OBJECTS IN THE GROUND INCLUDING IMPROVED MEANS FOR ACCURATE CORRELATION OF MEASURED MAGNETOMETER PROBE SIGNALS TO PROBE POSITIONS

[75] Inventor: Horst Reinhardt, Eningen, Germany

[73] Assignee: Vallon GmbH, Eningen, Germany

[21] Appl. No.: 139,102

[22] Filed: Oct. 18, 1993

[30] Foreign Application Priority Data

Oct. 21, 1992 [DE] Germany .......................... 42 35 356.4

[51] Int. Cl.⁶ ......................................... G01V 3/08
[52] U.S. Cl. ...................... 324/345; 324/326; 324/334
[58] Field of Search ...................... 324/326, 327, 324/328, 329, 330, 331, 344, 345, 334–337, 244; 342/459

[56] References Cited

U.S. PATENT DOCUMENTS

| 4,629,990 | 12/1986 | Zandee ................................. 324/330 |
| 5,045,368 | 3/1991 | Cosman et al. .................... 428/34.1 |

FOREIGN PATENT DOCUMENTS

| 3151523 | 7/1983 | Germany . | |
| 3922303 | 10/1991 | Germany . | |
| 0250888 | 10/1989 | Japan ....................................... 324/345 |

*Primary Examiner*—Sandra L. O'Shea
*Assistant Examiner*—Jay M. Patidar
*Attorney, Agent, or Firm*—Michael J. Striker

[57] ABSTRACT

The locating system for locating magnetic objects in the ground includes a series of position transmitters arranged at predetermined positions along a measurement path; a magnetometer probe movable by an operator over the measurement path and including a device for generating measured magnetometer signal values; a position detector including a sensor movable over the measurement path together with the magnetometer probe, the sensor producing a sensor position signal value when the sensor passes over each position transmitter along the measurement path and a data receiving and analyzing unit connected with the position detector to receive the position signal values and with the magnetometer probe to receive the measured magnetometer signal values independently of the position detector. The data receiving and analyzing unit then accurately determines a functional relationship between magnetometer probe response and the magnetometer probe position to more accurately locate the magnetic objects in the ground.

17 Claims, 5 Drawing Sheets

LOCATING SYSTEM FOR FINDING MAGNETIC OBJECTS IN THE GROUND INCLUDING IMPROVED MEANS FOR ACCURATE CORRELATION OF MEASURED MAGNETOMETER PROBE SIGNALS TO PROBE POSITIONS

BACKGROUND OF THE INVENTION

The present invention relates to a locating or finding system and, more particularly, to a locating system with a magnetometer for finding magnetic objects in the ground.

A magnetometer can be used to find a magnetic object or objects in the ground. Measured magnetometer values generated by the magnetometer can be graphically illustrated. When measurements are made to find a magnetic object with the magnetometer, an operator carrying the magnetometer walks over a predetermined measurement path and the magnetometer collects data as it and the operator move over the measurement path. The measured magnetometer signal values produced by moving the magnetometer over several parallel measurement paths can be illustrated together in a single graph or diagram.

A locating system is described in German Published Patent Application 39 22 303 A1. in which position dependent measured values along individual measurement paths at positions nearly equally spaced from each other are stored in a memory and thus can be related to the measurement paths. The accuracy of the relationship of measured magnetometer response to magnetometer probe position depends essentially on how exactly the measured values can be associated with the measured positions. So that as accurate as possible a correlation can be made, the operator can be provided with a predetermined step frequency with acoustic or visual signals. During the course of the measurement path the operator tries to synchronize his motion to the predetermined step frequency and thus to maintain as constant a step length as possible. From the step length and the predetermined frequency the position of the operator and thus the magnetometer probe on the measurement path can be approximately determined.

SUMMARY OF THE INVENTION

It is an object of the present invention to provide a more accurate correlation of measured magnetometer signals indicative of a magnetic object in the ground with position of the magnetometer over a measurement path over which the magnetometer moves.

According to the invention, the locating system for locating magnetic objects located in the ground includes a plurality of position transmitters spaced from each other at predetermined positions over a measurement path; a magnetometer probe movable by an operator over the measurement path and including means for generating measured magnetometer signal values as the magnetometer probe is moved by the operator over the measurement path; position detector means for measuring magnetometer probe position including sensor means for sensing when the sensor means passes over each position transmitter and for generating a magnetometer probe position signal value indicative of magnetometer probe position on the measurement path, the sensor means being movable over the measurement path together with the magnetometer probe in a fixed spatial relationship with the magnetometer probe; and data receiving and analyzing means for accurately obtaining a functional relationship between the measured magnetometer position signal values and the magnetometer probe position. The data receiving and analyzing means is separately connected to the position detector means to receive the magnetometer position signal values and to the means for generating the measured magnetometer signal values.

In preferred embodiments of the invention means for generating a stepping frequency signal for cueing the steps of the operator over the measurement path can be provided. This cueing means can transmit stepping frequency signals to the magnetometer probe. The operator then responds to the periodically generated stepping frequency signals by taking a step on cue along the measurement path while carrying the magnetometer probe and sensor means. In this way an approximately constant speed can be obtained over the measurement path.

With or without a stepping frequency signal a very accurate determination of the location of the beginning of the measurement path and the end of the measurement path can occur because of the position transmitters, which is a continual problem in the commercially available locating systems. The average speed of the operator can be determined by the basic system without a stepping frequency signal. Also even the speed fluctuations from the average value can be determined and considered in the measurement protocol.

The measured magnetometer signal values are generated by the magnetometer probe in an exact time sequence. The later correlation of the measured signals to each path segment occurs in cooperation with the position transmitters. A predetermined number of measured magnetometer signal values are expected along the measurement path at the correct initial speed. If more or less measured values are determined along the measurement path, these values are reduced to the expected number of measurement values by interpolation. The measured magnetometer signal values and the position transmitter signals received by the data receiving and analyzing means are separate data signals.

Advantageously electric circuit means is used as a position transmitter, which includes a transmitter oscillator coil and a condenser. The position transmitters, each of which are in a plastic housing, can be arranged in a row at equal intervals on a strip which passes through the housing. In experimental tests however a broken line was used with great success, in which exactly equal distances were provided between position transmitters attached together with line segments of a strip. The plastic housing of the position transmitter is provided with attachment slots on opposite ends of the plastic housing so that the position transmitters can be connected at predetermined distances from each other.

The sensor means comprises a receiver oscillator circuit means which is mounted near the magnetometer probe so that it moves together with the magnetometer probe over the position transmitters. An exact spatial correlation between the position transmitter and the magnetometer probe is possible in this way. An amplitude change or a frequency resonance occurs between a transmitter oscillator circuit means and the receiver oscillator means when the sensor means passes over the position transmitter having the transmitter oscillator circuit means. For this purpose the oscillator voltage of the receiver oscillator of the sensor means can be applied to a comparator via a rectifier and a subsequently connected amplifier. The comparator generates a pulsed signal when a voltage change occurs. The resonance frequencies of the transmitter oscillator circuit and the receiver oscillator circuit are advantageously equal and in the Kiloherz region. Good measurement results were determined with the resonance frequency between 12 kH and 18 kH and with oscillator coils having a diameter of about 5 cm. Advantageously the resonance frequency range is over 100 Hz and outside of the working frequency range of the magnetometer and its overtones.

The pulsed signals generated by the position detector means are fed to the measurement receiving and analyzing device when the position detector means passes over the first position transmitter at the beginning of the measurement path. When the position detector means passes over the last position transmitter the measurement unit determines that the end of the measurement path has been reached. By the exact determination of the beginning and the end of the measurement path an exact correlation of position with measurement results is obtained over the entire course of the measurement.

The pulsed signals are counted in a counter means, which signals the measurement beginning and measurement end when the counter means reaches certain predetermined states.

The measurement unit can correlate the measurement results from the magnetometer very accurately with the position with the aid of the timed pulsed signal sequence and the known distances between the position transmitters. In this way one obtains diagrams, which allow a very accurate determination of the location of magnetic objects in the ground because of the accurately determined relationship between measured magnetometer signal values and the magnetometer probe position.

In a preferred embodiment active electronic components are provided in the position transmitters for transmission of information regarding the position of a position transmitter relative to the sensor means when the sensor means passes over it. This information can for example include the column and row in which the position transmitter is found. The field of the magnetometer probe induces in an oscillator coil or a special coil in the position transmitter a voltage, which energizes the above-mentioned electronic components, so that the transmission of information regarding the position of the position transmitter is possible. This can occur for example so that when the sensor means approaches the position transmitter concerned a rectifier circuit rectifies the voltage induced in the position transmitter and the rectified induced voltage is fed to an electronic identification circuit means, which influences the oscillator circuit means depending on a position transmitter characteristic value stored in memory means. The influencing can occur when the oscillator circuit is short circuited by the recognition circuit according to the position transmitter characteristic value stored in memory means in an individual short circuit sequence. These changes effect the amplitude change or the frequency resonance of the oscillator and can thus be determined by the measurement receiving and analyzing unit so that they are correlated with a certain position transmitter. Advantageously the electronic components are present in a chip, which contains both the active electronic components and also the memory means. This type of chip can be obtained commercially.

The reliability of the system is even further improved substantially in the foregoing embodiment. So that inaccuracies are prevented, which arise because of failure of position transmitters, since the position of the next operating position transmitter can be determined with the aid of the position transmitter characteristic value. Because each position transmitter is in a position to deliver information regarding its position, such as row and column, exact correlation of position with the measured magnetometer values is possible.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
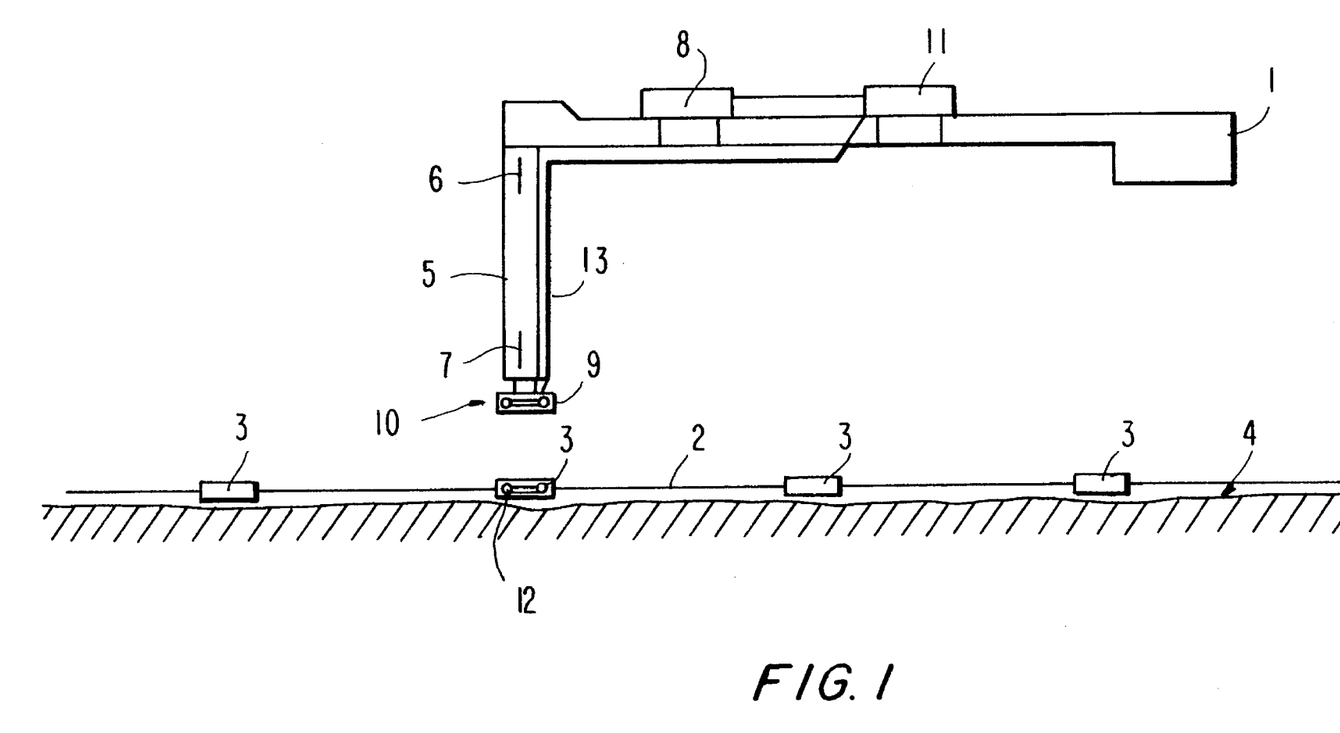
FIG. 1 is a side view of a position determining system according to the invention comprising a magnetometer probe and a plurality of position transmitters connected to each other in a line.

The position determining system according to the invention shown in FIG. 1 comprises a magnetometer probe 1 and a plurality of position transmitters 3 connected to each other in a line 2 at equal distances from each other. The line 2 with the position transmitters 3 extends longitudinally on the course surface 4 along a straight measurement path.

The magnetometer probe 1 is carried and moved by an operator, who is not shown, at a predetermined distance from the ground as shown in FIG. 1. A vertical downwardly directed sensor pipe 5, in which the magnetometer sensors 6,7 are located, is on the front side of the magnetometer probe 1. The magnetometer sensors 6,7 measure in a known way the field strength of the earth's magnetic field, which is effected by the presence of magnetic objects located in the ground. The measured magnetic field values are stored and analyzed in a data receiving and analyzing unit 8 for display on a display unit or for transmission to a printer. The measurement of the magnetic field strength is not the subject of the present invention and thus is not described here in detail. A suitable description of the measurement of the magnetic field strength is presented in German Patent 39 22 303 A1.

A receiving coil 9 is oriented horizontally at the lower end of the sensor pipe 5 and is part of a receiving oscillator circuit of a sensor means of a position detector means 11. Position detector means 11 is attached to the magnetometer probe 1 so that it moves with it. The position detector means 11 can be integrated also in the data receiving and analyzing unit 8.

Figure 3:
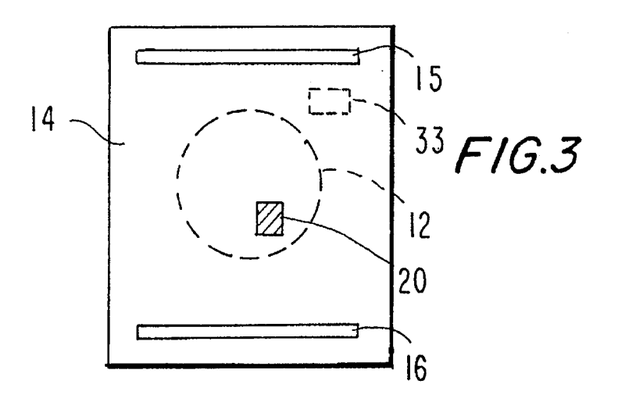
FIG. 3 is a detailed plan view of a position transmitter of FIG. 2 in a housing.

A first embodiment of the position transmitter 3 comprises a transmitting oscillator circuit with an transmitter oscillator or transmitter coil 12 and a condenser 20 (FIG. 3). The transmitter coil 12 has the same diameter as the coil 9. Furthermore the receiving oscillator circuit, which is part of sensor means 10, is tuned to the same resonance frequency as the transmitting oscillator of the position transmitter 3.

Figure 2:
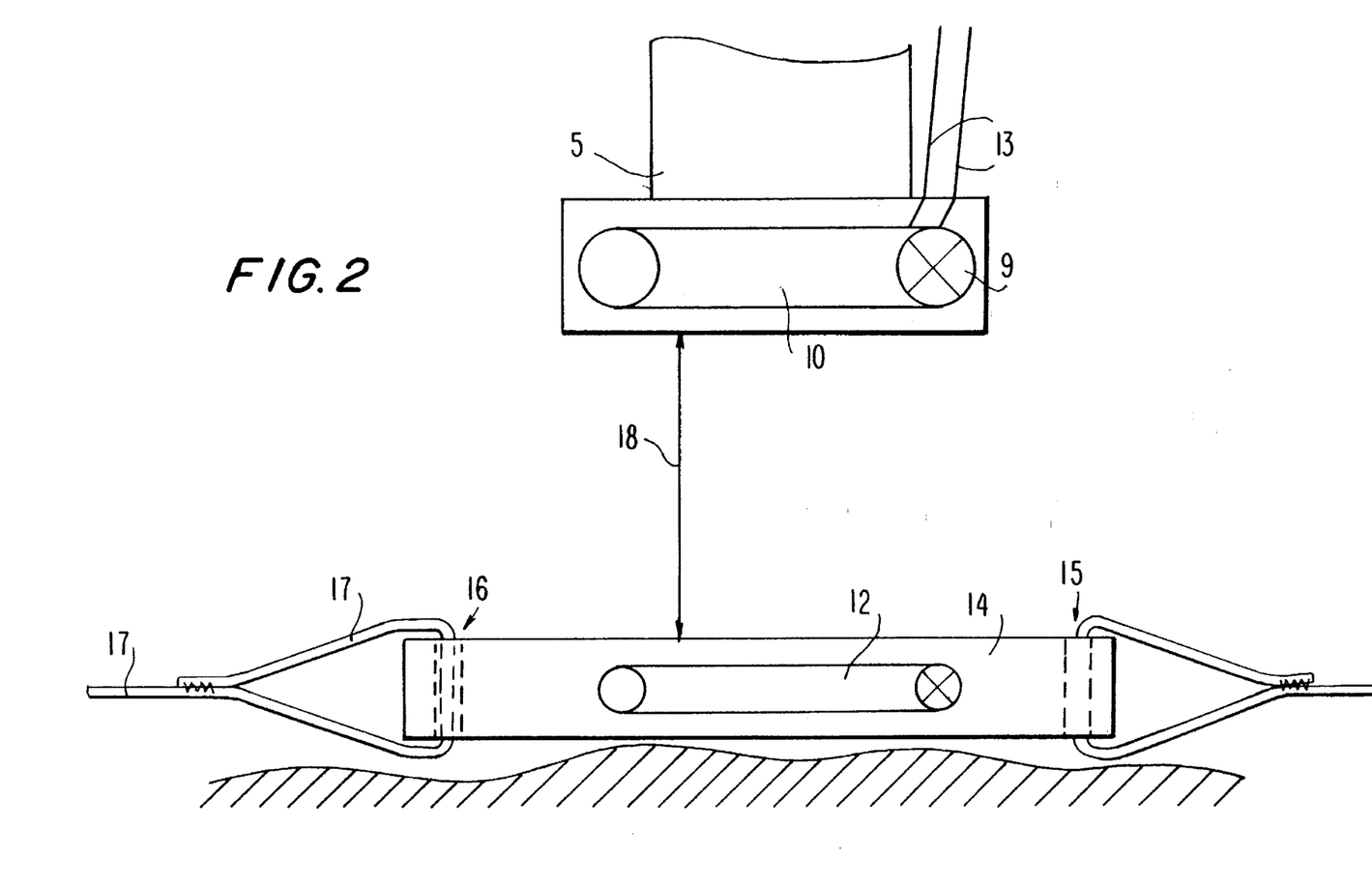
FIG. 2 is a detailed side view of the apparatus shown in FIG. 1.

In FIG. 2 the lower end of the sensor pipe 5 is shown in greater detail with the sensor means 10 attached to it and the receiving coil 9 in it. Cable 13 connects the sensor means 10 to the position detector means 11.

The transmitting coil 12 is in a plastic transmitter housing 14, which has attachment slots 15, 16 at both ends. A strap 17 whose end is sewn into a loop passes through the attachment slot 16. The strap 17 provides a definite connection to the neighboring position transmitter. The line 2 is formed by a plurality of position transmitters 12 and connecting straps 17.

The distance 18 between the sensor means 10 and position transmitter 3 can be between 5 and 20 cm. The diameters of the receiving coil 9 and the transmitting coil 12 are equal and the diameter can be for example from 5 to 6 cm.

Figure 5:
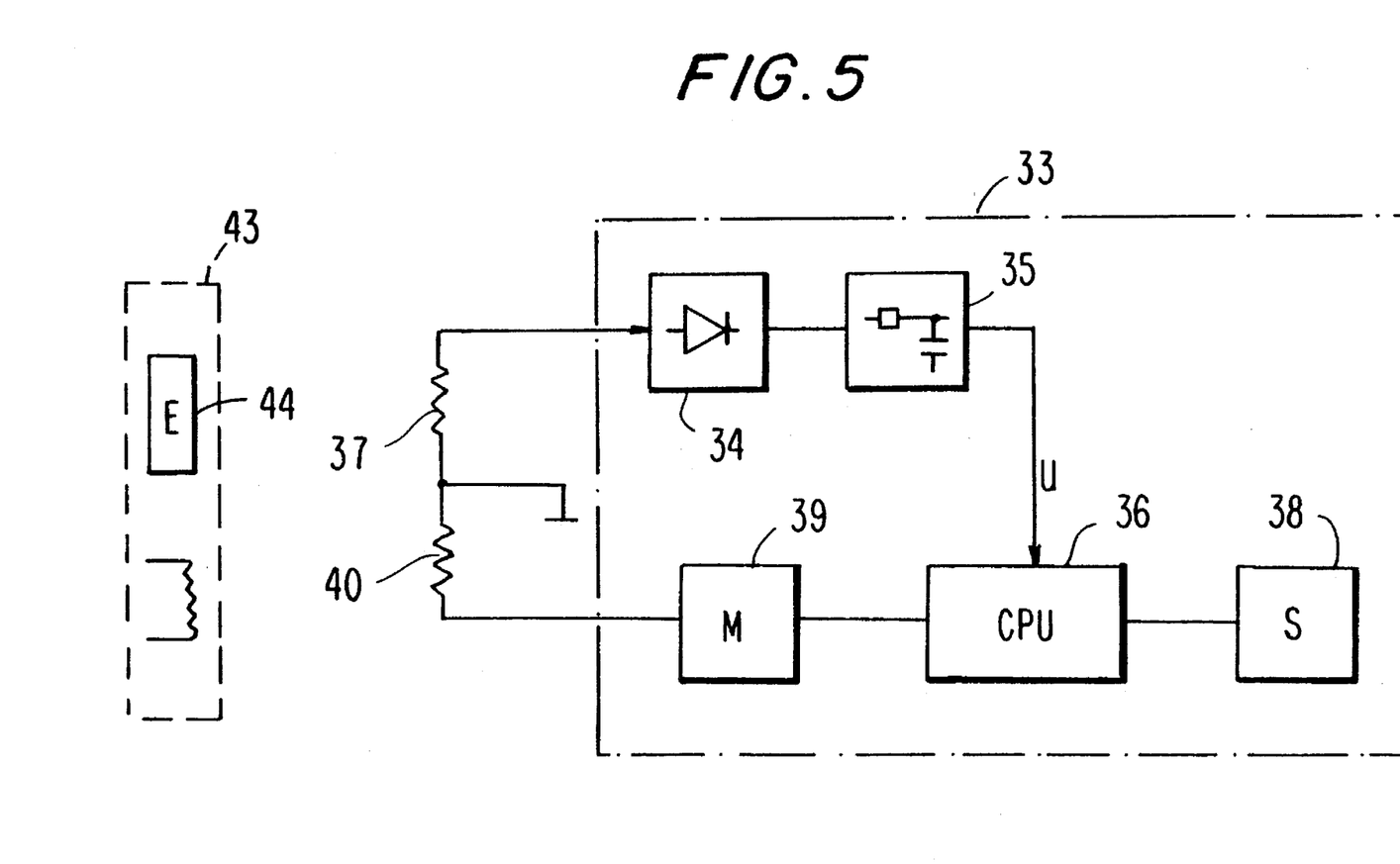
FIG. 5 is a block diagram of the chip shown in FIG. 3 and including a position transmitter identification circuit as well as an energizing circuit portion for it.

FIG. 3 is a top view of the position transmitter 3 (also showing a second embodiment of the position transmitter), in whose plastic housing 14 the transmitter coil 12 and the condenser 20 of the transmitting oscillator circuit means and the chip 33 are located. Chip 33 is only part of the second embodiment of the invention and is a commercially obtainable intelligence chip, which can influence a voltage induced in a coil and the transmitter oscillator circuit by an electronic identifying circuit means depending on the information stored in a memory 39. The memory is similarly integrated in the chip 33 (FIG. 5).

Figure 4:
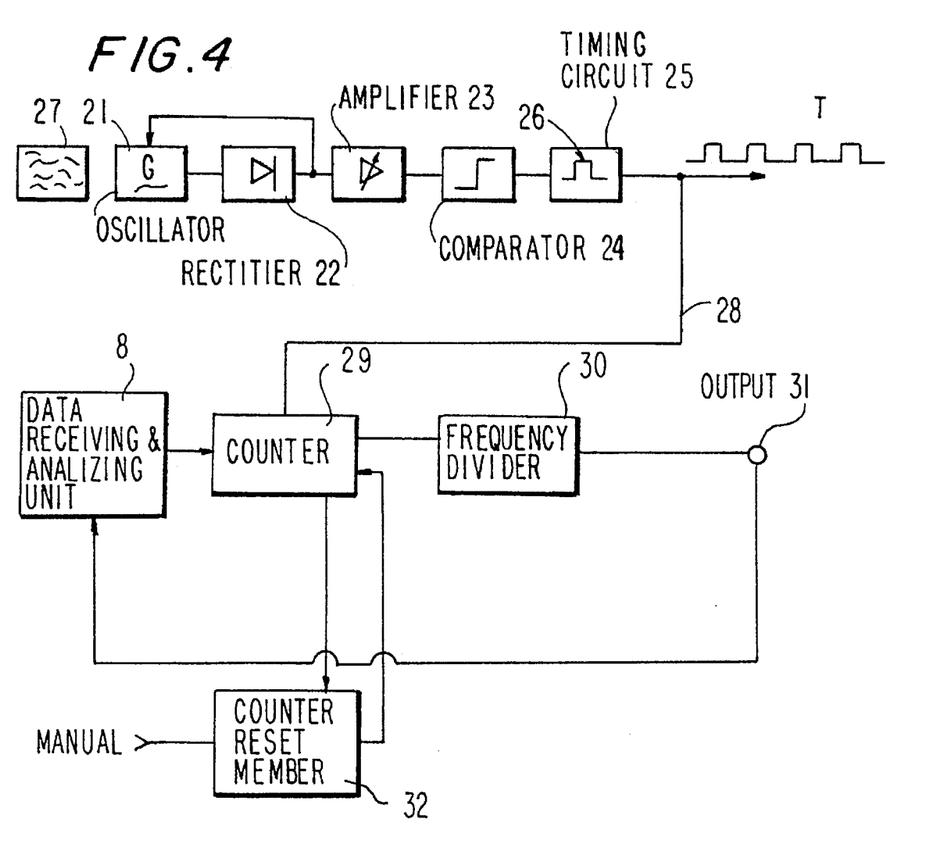
FIG. 4 is a block diagram of a position detector circuit for generating a position signal when the position detector passes over a position transmitter.

The position detector means shown in FIG. 4 comprises an oscillator circuit 21, which includes the receiving coil 9 in FIG. 1 acting as the oscillator coil. The oscillator voltage is fed to an amplifier 23 via a rectifier 22, whose output voltage is converted by a subsequently connected comparator 24 and timing circuit 25 into a pulse signal, when the oscillator circuit 21 of the sensor means 10 is driven by the position transmitter 3. The transmitter oscillator circuit means 27 including the transmitter coil 12 (FIGS. 1 and 2) in the position transmitter 3 acts to change a voltage at the output of the receiving oscillator circuit 21, which is used to make the a pulse 26 which comprises the pulsed signal.

The pulsed signal T produced at the output of the timing circuit 25 arrives over a conductor 28 at the input of a counter 29, which produces a start-stop signal at output 31 via a frequency divider 30. A counter reset member 32 allows an automatic or manual resetting of the counter 29. The counter 29 is otherwise controlled by the data receiving and analyzing unit 8 for example to provide a desired count of pulses. The data receiving and analyzing unit 8 receives the start-stop signal via the output 31.

The position transmitter could also be designed to operate without connection in a line and the position transmitters need not be equally spaced from each other. Instead of oscillator circuit means also plates, foils or the like made from non-iron-containing material could be used to provide a control of the position and correction of the measured magnetometer values for incorrect motion speed. This can also occur by changing an internal cycle of the data receiving and analyzing unit 8.

The block diagram of the circuit of FIG. 5 illustrates the structure of the chip 33 of FIG. 3, which is bounded by the dot-dashed line, in the second embodiment of the invention. The chip 33 contains a rectifier 34 and the RC-branch 35 connected to it, which supplies a supply voltage U to a control unit or central processing unit 36. The energy is drawn from a first coil 37, which receives an electromagnetic signal of the send and receive device 43, which is also attached to and moves with the magnetometer probe 1, so that a voltage is induced in the coil 37.

Figure 7:
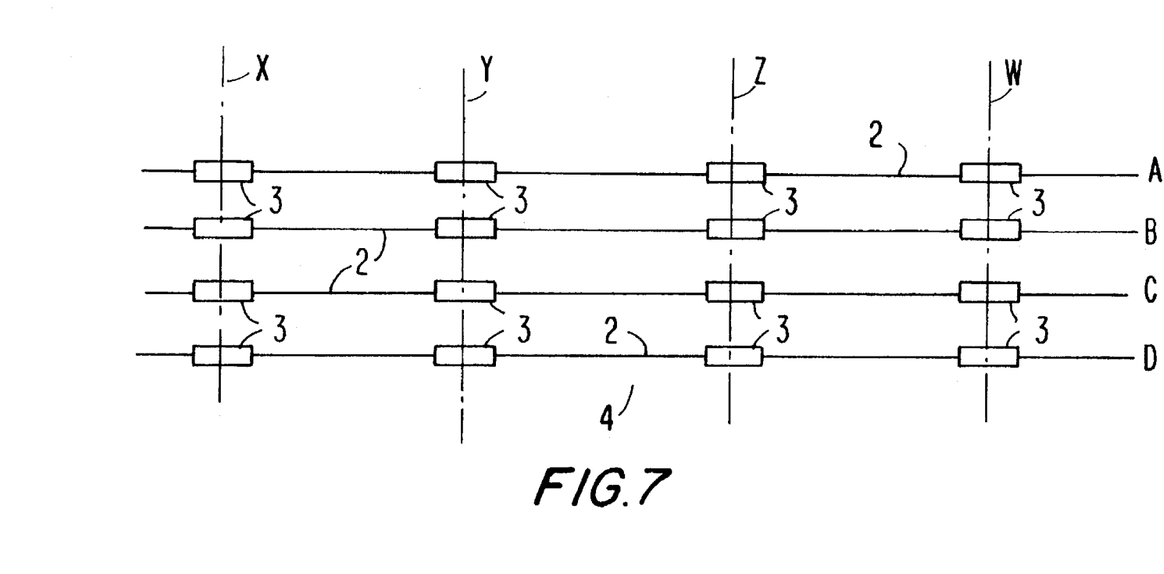
FIG. 7 is a top plan view of a two dimensional array of position transmitters arranged in rows and columns over which the magnetometer probe can be moved.

The central processing unit 36 retrieves a stored individual position transmitter characteristic variable from a memory 38, which includes information regarding position transmitter position. A modulator 39 connected to the central processing unit 36 feeds a modulating signal to a sending coil 40, which is characteristic of the position transmitter characteristic variable. The signal propagated by the sending coil 40 can be received in the sending and receiving unit 43, whereby the analyzing electronic circuit means 44 of the sending and receiving unit 43 can determine the position transmitter characteristic variable. The position transmitters 3 can be arranged in an array or matrix over an area 4' in a series of rows A,B,C,D, . . . and columns W,X,Y,Z, . . . as shown in FIG. 7. The position transmitters 3 are connected in lines 2 which form the individual rows. The position transmitter characteristic variable can give for example the row and the number of the position transmitter in the designated row which is activated as describe above so that an exact correlation of positions of the successively activated position transmitters to the measured values from the magnetometer probe 1 in a measurement protocol is possible by means of the position detector means 11 and the data receiving and analyzing unit 8.

In operation in the first embodiment shown in FIGS. 1 and 2 the magnetometer probe 1 is walked or stepped by the operator over the line 2 as explained, for example, in German Patent 39 22 303 A1 and produces measured magnetometer signal values whose change can indicate the proximity of a magnetic object in the ground. The time at which each measured value is measured by the magnetometer probe 1 is accurately measured. Furthermore a series of position signals for the magnetometer probe 1 are also produced independently of the measured magnetometer values by the position transmitters 3. Each of the position signals from the position transmitters 3 is generated as the magnetometer probe 1 carrying the sensing coil 9 passes over a position transmitter 3. This results in a series of exactly measured position values for the magnetometer probe 1 as determined by the position detector means 11. Since the relationship of the position of the magnetometer to time and the relationship of the measured magnetometer values to time are both exactly known, the exact relationship between the measured magnetometer values and the position of the magnetometer probe can be determined by the data receiving and analyzing unit 8. When the apparatus is operated in this way, there is no need to provide a cueing signal or for the operator to walk at an exactly measured rate with a uniform steps size. However it is desirable to provide a cueing device so that measured signal will be produced at a more or less constant rate.

Figure 6:
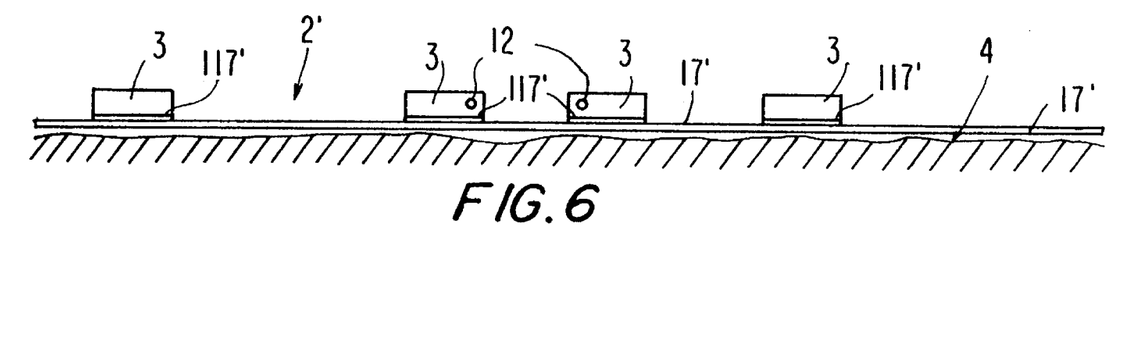
FIG. 6 is a side view of a portion of an alternative embodiment of the invention showing a different form of the line including the position transmitters.

In an alternative embodiment shown in FIG. 6, the position transmitters 3 can be attached to a strip 17' by adhesive means 117' to form the line 2' extending over the course area 4. The position transmitters 3 of course need not be equally spaced.

A cueing means 101 can be provided for the magnetometer probe 1 as shown in FIG. 1. The cueing means 101 produces either an audio or visually detected signal for the operator at a constant cueing frequency. When the cueing means 101 is operated to produce the cueing signal, the operator can advance along the measurement path carrying the magnetometer probe 1 with the sensor means 10 as shown in FIG. 1 at a nearly constant speed by taking a step of approximately constant size each time the cueing signal is generated. Then the data receiving and analyzing unit 8 can produce an approximate functional relationship between the measured values produced by the magnetometer probe (1) and the distance along the measurement path as in the prior art reference DE 39 22 303 A1. Then the position detector means 11 can be used to correct the approximate functional relationship according to the accurately determined positions of the magnetometer probe 1.

In another preferred embodiment of the invention an audio tone generating means 111 is provided which produces an audio tone when the sensor means 10 passes over one of the position transmitters 3. This audio tone generating circuit is connected to the position detector means 11 for that purpose.

The identification circuit which was mentioned in connection with FIG. 3 includes the central processing. unit 36, the memory 38 and the modulator 39 in FIG. 5.

While the invention has been illustrated and embodied in a locating system for magnetic objects in the ground having a magnetometer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Locating system for locating magnetic objects located in the ground, said locating system comprising:

a plurality of position transmitters (3) spaced from each other at predetermined positions over a measurement path;

a magnetometer probe (1) movable by an operator over said measurement path and including means (5,6,7) for providing successive measured magnetometer signal values as said magnetometer probe (1) is moved by said operator over said measurement path;

position detector means (11) for measuring magnetometer probe position, said position detector means (11) including sensor means (10) for sensing when said sensor means (10) passes over each of said position transmitters (3) and for generating successive magnetometer probe position signal values indicative of said magnetometer probe position on said measurement path when said sensor means (10) passes over each of said position transmitters (3), said sensor means being movable over said measurement path together with said magnetometer probe (1) in a fixed spatial relationship with said magnetometer probe (1); and data receiving and analyzing means (8) for accurately obtaining a functional relationship between said successive measured magnetometer signal values and said magnetometer position signal values, said data receiving and analyzing means (8) being connected to said position detector means (11) to receive said magnetometer position signal values and connected to said means (5,6,7) for generating said measured magnetometer signal values to receive said measured magnetometer signal values.

2. Locating system according to claim 1, further comprising cueing means (101) for generating an operator stepping signal selected from the group consisting of acoustic signals and optical signals at constant frequency so as to cue said operator to move said magnetometer probe (1) and said position detector means (11) at an approximately constant speed over said measurement path in response to said stepping signal, said data receiving and analyzing means (8) including means for calculating an approximate relationship between said successive measured magnetometer signal values and said magnetometer probe position according to said constant frequency of said operator stepping signal and means for correcting said approximate relationship for variations in a motion speed of said operator over said measurement path according to said successive magnetometer position signal values.

3. Locating system according to claim 1, wherein each of the position transmitters (3) includes a plastic housing (14) provided with attachment slots (15,16) on opposite ends thereof, said attachment slots (15,16) providing means for attachment of straps (17) connecting each of the position transmitters (3) with each other in a line (2).

4. Locating system according to claim 11, wherein each of the position transmitters (3) is a plate or a foil made from a material not containing iron.

5. Locating system according to claim 1, wherein each of the position transmitters (3) comprises a transmitter coil (12) and a condenser (20) connected electrically to said transmitter coil (12), said transmitter coil and said condenser being arranged in a common plastic housing (14), and said sensor means (10) includes receiving oscillator circuit means (21) and means (22,23,24) for detecting one of a frequency resonance and a predetermined signal amplitude change in said receiving oscillator means occurring when said sensor means (10) passes over one of said position transmitters (3).

6. Locating system according to claim 5, wherein each of said position transmitters (3) has a transmitting oscillator circuit means (12,20; 27) including said transmitter coil (12), and wherein said receiving oscillator circuit means (21) and said transmitting oscillator circuit means (12,20; 27) have equal resonance frequencies above 100 Hz.

7. Locating system according to claim 6, wherein said resonance frequencies are outside of an operating frequency band of said magnetometer probe (1).

8. Locating system according to claim 7, wherein said receiving oscillator circuit means (21) includes a receiving coil (9), and wherein said transmitter coil (12) and said receiving coil (9) are equal sized.

9. Locating system according to claim 8, wherein said transmitter coil and said receiving coil (9) each have a diameter approximately equal to 5 cm.

10. Locating system according to claim 5, further comprising means (26) for converting said magnetometer position signal values into a plurality of pulsed signals including a first pulse signal, a beginning of measurement being determined by said first pulsed signal and an end of measurement being determined by generation of a predetermined number of said pulsed signals.

11. Locating system according to claim 10, wherein each of said position transmitters (3) includes memory means (38) containing information regarding a position of said position transmitter (3) and an identification circuit means (36,38,39) for generating an identification signal including said information regarding said position of said position transmitter (3).

12. Locating system according to claim 11, wherein said identification circuit means (36,38,39) has means (39) for controlling a transmitting oscillator circuit means (12,20)

including said transmitter coil (12) according to said information in said memory means (38), said means (39) for controlling acting to generate said identification signal when said sensor means (10) passes over said position transmitter (3) containing said identification circuit means (36,38,39).

13. Locating system according to claim 12, wherein said identification circuit means (36,38,39) includes means for short-circuiting said transmitting oscillator circuit means (12,20).

14. Locating system according to claim 11, wherein each of the position transmitters (3) includes a chip (33) containing said identification circuit means (36,38,39).

15. Locating system according to claim 12, wherein each of said position transmitters (3) includes a sending coil (40) and said means (39) for controlling includes means for modulating said sending coil (40).

16. Locating system according to claim 1, further comprising means (111) for generating an audible control tone when said sensor means (10) passes over each of said position transmitters (3).

17. Locating system according to claim 1, wherein said position transmitters (3) are attached to a strip (17') in a line (2') by adhesive means (117').

* * * * *